Dec. 21, 1965  J. T. KARBOSKY  3,224,211
PROCESSING LOW B.T.U. GAS FROM NATURAL GAS
Filed Nov. 20, 1961
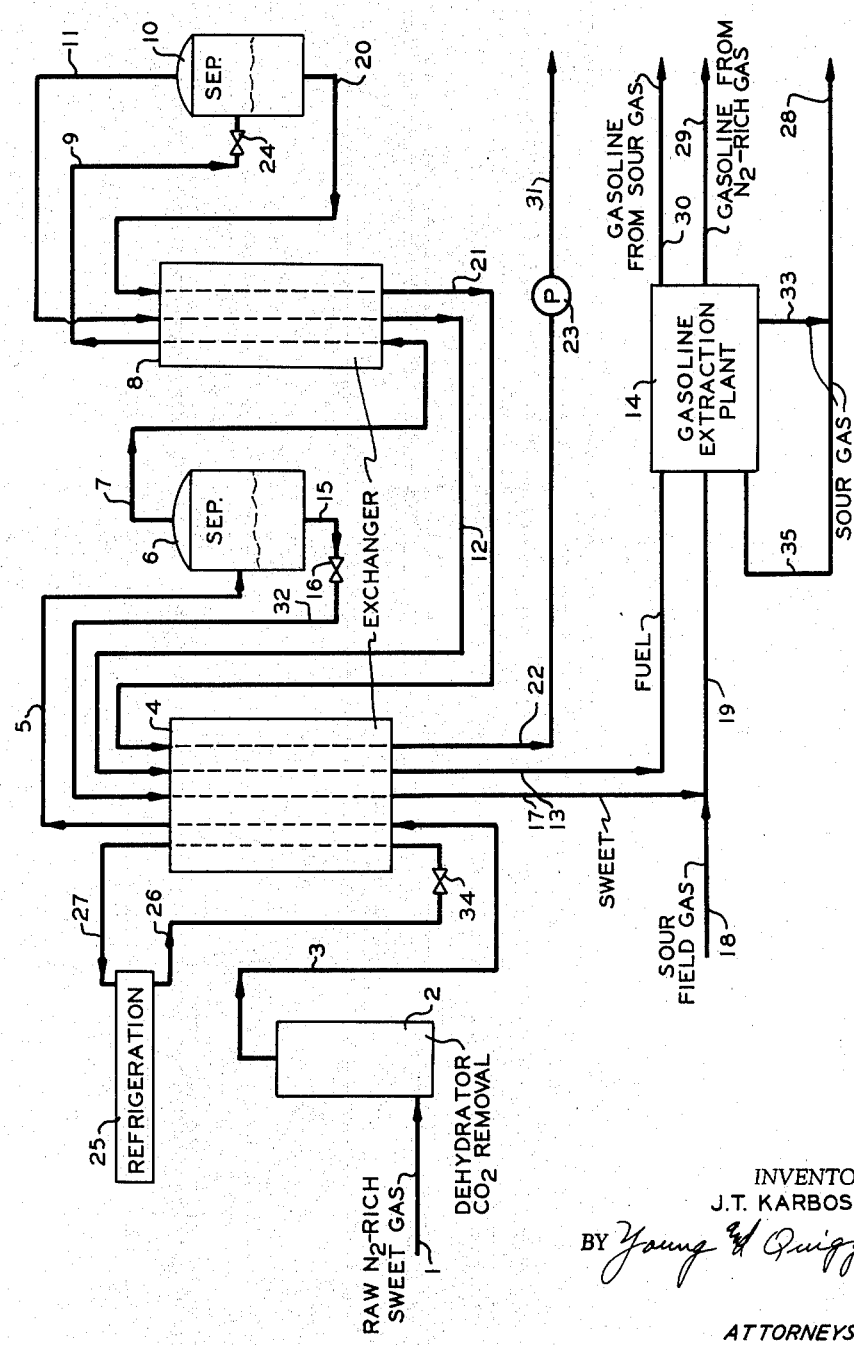
INVENTOR.
J.T. KARBOSKY
BY *Young & Quigg*
ATTORNEYS

United States Patent Office 3,224,211
Patented Dec. 21, 1965

3,224,211
PROCESSING LOW B.t.u. GAS FROM
NATURAL GAS
Joseph T. Karbosky, Bartlesville, Okla., assignor to
Phillips Petroleum Company, a corporation of Delaware
Filed Nov. 20, 1961, Ser. No. 153,356
3 Claims. (Cl. 62—23)

This invention relates to treatment of natural gases. In one aspect it relates to a method and apparatus for upgrading the heating value of a nitrogen-containing natural gas to a heating value acceptable to natural gas pipe line transportation companies. In another aspect it relates to a method and apparatus for upgrading the heating value of a nitrogen-containing natural gas with the simultaneous production of a reject nitrogen-rich gas stream suitable for use as plant fuel, and natural gasoline.

In Southwest Texas nitrogen-containing natural gases are produced from certain earth formations. At least some of these nitrogen-containing gases, even though they are sweet as regards sulfur content, cannot be sold to pipe line companies because they are too low in heating value. By Texas law such a gas, even though it is sweet as regards sulfur content, cannot be used for production of carbon black. Sour gases, however, can be used for production of carbon black. Also, such unsalable, low calorific value, sweet gases cannot by law be mixed with the sour gas for production of carbon black.

The present invention presents numerous advantages over the prior art and over conventional commercial practice. For example, products of this invention are treated in conjunction with sour gas in a conventional gasoline extraction plant. In the extraction plant, prior to this invention, a certain amount of sour residue gas was used to fuel the plant while the remainder of the sour residue gas was sold for carbon black production. By use of this invention, a sweet, high nitrogen-content natural gas is very inexpensively processed to remove sufficient nitrogen that the treated gas is upgraded and can be sold to pipe line companies. These companies require gas having a heating value greater than 1000 B.t.u. per standard cubic foot. Since it is extremely costly to extract all of the nitrogen from a gas in the form of a pure nitrogen product, I am able to extract sufficient of the nitrogen to upgrade the gas sufficiently to meet pipe line heating specifications and yet to produce a nitrogen product containing methane of such content that this nitrogen-methane gas can be used as plant fuel. Accordingly, I carry out my operation in such a manner that the waste nitrogen contains sufficient methane that it can be used as fuel. This fuel, which cannot be used, according to Texas law, for production of carbon black, can be used as plant fuel, thus freeing the normally used sour fuel gas for production of carbon black. In this manner a relatively large volume of gas is available for sale which without this invention cannot be sold.

In addition, a gaseous product, rich in condensible, gasoline boiling range hydrocarbons, is produced and is fed to a gasoline extraction plant with the result that the gasoline production therefrom is markedly increased.

These operations for removal of nitrogen from gas, with the production of a high B.t.u. salable gas, a nitrogen-methane fuel gas, and a product rich in condensible hydrocarbons, are carried out, according to this invention, in relatively inexpensive and simple equipment. Prior art, as, for example, U.S. 2,940,271, treats gas for removal of nitrogen but uses expensive and complicated equipment. In said patent, eight vessels and heat exchangers are used in contrast to the use of only four vessels and exchangers according to this invention. Capital investment, operating and maintenance costs are accordingly low.

An object of this invention is to provide apparatus and a process for upgrading the heating value of a nitrogen-containing gas to a calorific value suitable for sale, as to a pipe line company. Another object is to provide apparatus and a process for upgrading a sweet nitrogen-containing gas to a suitable calorific value with the production of a nitrogen-rich gas containing sufficient hydrocarbon to be suitable for use as a plant fuel. Still another object of this invention is to provide apparatus and a process for the production of a gasoline boiling range product from a sweet nitrogen-containing gas and at the same time produce a salable, high calorific, sweet gas. Still other objects and advantages of this invention will be realized upon reading the following description which, taken with the attached drawing, forms a part of this specification.

According to this invention, I treat a sweet, low calorific value, nitrogen-containing natural gas by a series of cooling and flashing steps whereby a large portion of the nitrogen is separated as an off-gas fuel product. A first gas stream containing condensible natural gasoline boiling range hydrocarbons and a second condensate produces a gas of upgraded calorific value sufficient for sale to pipe line companies.

The drawing illustrates, in diagrammatic form, an arrangement of apparatus parts for carrying out the process of this invention.

In the drawing a raw, nitrogen-rich, sweet gas flows through a conduit 1, from a source, not shown, to a dehydrator and $CO_2$ removal apparatus 2. The dehydrator portion of the apparatus can be a silica gel or other dehydrating absorbent or absorbent such as a glycol dehydrator system. The $CO_2$ removal portion can be an amine treater or other suitable $CO_2$ removal means. Dehydrated gas flows from dehydrator 2 through a conduit 3 to an indirect heat exchanger 4. This indirect heat exchanger 4 is chilled in part by subsequently produced cold products and in part by an independent refrigeration system 25. This refrigeration system can be any suitable refrigeration system, such as an amonia system, ethylene, ethane or propylene or propane refrigerant system. Cooled, liquefied refrigerant at 0° F. or below flows from the system 25 through a conduit 26 through an expansion valve or unit 34 with the result that latent heat is absorbed downstream of valve 34 in exchanger 4. Vaporized warmed refrigerant is returned to the compression-condensation portion of this system through a conduit 27. The thus partly chilled gas from conduit 3 leaves the exchanger 4 and is passed through a conduit 5 to a liquid-gas separator 6. In this separator a first condensate is separated from a first uncondensed gas. The uncondensed gas leaves separator 6 and flows through a conduit 7 to a second indirect heat exchanger 8 which is chilled in its entirely by products subsequently produced. This further chilled gas or fluid flows from exchanger 8 by way of a conduit 9 and experiences a reduction in pressure on passing through a valve 24 into a second separator tank 10. The further cooling of this gas in exchanger 8 and still further cooling by pressure reduction in valve 24 produces a second condensate and a second uncondensed gas. These latter two products are produced at a still lower temperature than the temperature of the gas prior to expansion or pressure reduction in conduit 9. This second separated gas flows through a conduit 11 to absorb heat from heat exchanger 8 and also the separated liquid flows through a conduit 20 and vents through exchanger 8 for absorption of additional heat from the exchanger. Thus, these two streams of vapor and liquid flowing through exchanger 8 cool the separated gas from conduit 7 on its passage through the exchanger.

The heat exchanged gas from conduit 11 emerging from exchanger 8 passes on through a conduit 12 into the first heat exchanger 4 to absorb heat therefrom. Since this gas is rich in nitrogen and contains a substantial portion of the nitrogen in the original raw sweet gas but at the same time contains a substantial portion of hydrocarbon, it is passed from exchanger 4 through conduit 13 to suitable for use as a fuel.

Reference numeral 14 identifies a conventional gasoline extraction plant. This extraction plant can, if desired, be a conventional absorption-stripping plant such as is used in many areas. Since stripping stills require heat for stripping absorbed hydrocarbons from an absorption oil, this fuel from line 13 can be used in providing steam for stripping and for other heat as required in the plant.

The second condensate flowing through conduit 20 is vaporized in exchanger 8 and the gas flows through conduit 21, through heat exchanger 4 and the effluent gas passes from the system through a conduit 22. A pump 23 increases the pressure of the gas in conduit 22 for passage to disposal as desired. This gas is a main product, or at least one of the main products of this operation, and is the sweet gas produced from the nitrogen-containing sweet gas and is of sufficient calorific value for sale to pipe line companies.

The first condensate separated in separator 6 leaves this separator through a conduit 15 provided with an expansion valve 16 and on through a conduit 32 and through the heat exchanger 4. As a result of pressure reduction in valve 16 and as a further result of absorbing heat in exchanger 4, this condensate becomes fully vaporized and only vapor issues from exchanger 4 through a conduit 17. This gas in conduit 17 contains the more easily condensible constituents of the original nitrogen-containing sweet gas and this material is added to a sour field gas in conduit 18 and the mixture is passed on through conduit 19 to the above-mentioned gasoline extraction plant 14. The sweet gas from conduit 17 contains a major portion of gasoline boiling range hydrocarbons from the original sweet gas and the gas can be mixed with the sour gas as long as the mixture is passed to a gasoline plant for the extraction of the gasoline product.

Prior to this invention, a portion of the absorber off-gas from the gasoline extraction plant 14 treating only sour field gas from conduit 18 is illustrated as passing through a conduit 35. This volume of gas is the volume of gas which was previously used as fuel in the boiler providing reboiling heat for the stripping still and for other gasoline plant uses. According to this invention, the high nitrogen-content separator gas from separator 10 issuing from the first heat exchanger 4 through conduit 13 is now used as fuel for the operation of gasoline plant 14 thus freeing the sour off-gas illustrated as passing through conduit 35. This sour gas, even though it is a dry gas which may or may not be of a high calorific value, can be sold or utilized for the production of carbon black. The materials flowing through conduit 33 are intended to illustrate the main production of sour absorber residue gas suitable for use as carbon black. This amount of sour residue gas flowing through conduit 33 illustrates the amount of sour gas previously used for carbon black production purposes prior to the combining with the treating apparatus of this invention. The combined streams of sour gases from conduits 33 and 35 pass through a conduit 28 for such disposal as desired, for example, passage to a carbon black producing plant. Conduits 29 and 30 are conduits through which extracted gasoline can be passed. Conduit 30 represents the outlet for the gasoline originally produced from the sour field gas entering the gasoline extraction plant through conduit 18 prior to this invention. The conduit 29 represents the outlet for the gasoline produced from the nitrogen-rich sweet gas. Thus, the gasoline flowing through conduit 29 represents the increase in gasoline production obtained by treating the raw nitrogen-rich sweet gas according to this invention with the sour field gas for gasoline extraction in plant 14.

Pressures given in this specification are in terms of p.s.i.a. (pounds per square inch absolute).

Table 1 gives the composition of streams in certain apparatus parts in terms of mol per cent of the stream and in case of liquid or liquefied gases the amounts of such liquefied products in terms of gallons per day. The products are also identified as to whether they are sweet or sour as regards sulfur content.

TABLE 1

*Stream compositions in mol percent*

| Stream No. | 1—Sweet | | 31 | 17 | | 29 | | 13—Sweet |
|---|---|---|---|---|---|---|---|---|
| | Mol percent | G.p.d. | Mol percent | Mol percent | G.p.d. | G.p.d. | Percent Rec. | Sweet |
| Component: | | | | | | | | |
| $N_2$ | [1] 23.09 | | 12.06 | 1.90 | | | | 49.63 |
| $CH_4$ | 63.51 | | 73.83 | 21.99 | | | | 49.81 |
| $C_2H_6$ | 8.34 | | 10.98 | 21.27 | | | | .56 |
| $C_3H_8$ | 3.25 | 17,823 | 2.68 | 27.58 | 8,477 | 3,840 | 21.5 | |
| $C_4H_{10}$ | 1.13 | 7,098 | .45 | 15.58 | 5,473 | 4,597 | 64.8 | |
| $C_5H_{12}$ | .39 | 2,817 | | 6.52 | 2,638 | 5,296 | 96.7 | |
| $C_6+$ | .29 | 2,658 | | 5.16 | 2,658 | | | |
| | 100.00 | 30,405 | 100.00 | 100.00 | 19,246 | 13,733 | [2] | 100.00 |
| Vol. at 14.65 p.s.i.a. 60° F. and MM-CFD | 20 | | 12.709 | 1.12 | | | | 6.171 |
| B.t.u./c.f. | 940 | | 1,027 | | | | | 541 |

[1] $N_2$ Content varies from 18 to 31 mol percent; B.t.u.-C.F. varies from 840 to 1000.
[2] Additional gallonage recovered by use of $N_2$-containing gas while upgrading heating value thereof.

Table 2 gives the gas volumes of several streams of the process identifying the streams as to whether they are sweet or sour. The heating value of B.t.u. per cubic foot (dry basis) is also given for one of the streams in Table 2.

TABLE 2

*Gas volumes*

| Stream No. | 18—Sour | 35—Sour | 33—Sour | 28—Sour |
|---|---|---|---|---|
| Vol. mm.-c.f.d. | 40 | [1] 2.78 | [1] .72 | 3.5 |
| B.t.u./c.f. | | 1,145 | | |

[1] Volume at 14.65 P.s.i.a. (atmos.) and 60° F.

The percent recoveries in Table I resulted from processing at 50 to 150 p.s.i.g. At 400 to 500 p.s.i.g. the percent recovery is 40% to 50% for propane, about 80% for butane and about 100% for $C_{5+}$ hydrocarbons.

Table 3 gives operating temperatures and pressures for certain process points illustrated in the figure. Illustrative specific temperatures and pressures are given for several of these process points along with permissible operating pressure and temperature ranges.

TABLE 3

*Operating conditions*

| Equipment part | Pressure, pounds sq. in. abs. | | Temperature, °F. | |
|---|---|---|---|---|
| | Specific | Range | Specific | Range |
| 1 | 525 | 500–750 | 80 | |
| 6 | 500 | | −40 | |
| 9 | 500 | | −162 | −140 to −180 |
| 10 | 300 | 200–400 | −182 | −160 to −200 |
| 12, 21 | 290 | | −57 | |
| 22 | 280 | | +70 | |
| 31 | 615 | | +90 | |
| 32 | 25 | | −93.5 | |
| 17 | 20 | | +70 | |
| 25 | atm. | | −57 | |

Exchangers 4 and 8 can be any suitable multiple pass indirect heat exchangers desired. These exchangers are provided with sufficient insulation suitable for conservation of the refrigeration conducted therein, the insulation and containers being termed cold boxes in the industry. Also, conduits and other apparatus through which materials flow at below atmospheric temperature are also provided with suitable insulation.

While certain embodiments of the invention have been described for illustrative purposes, the invention obviously is not limited thereto.

I claim:
1. A process for processing a nitrogen-rich, sweet natural gas stream below the standard of heating value for sale for heating purposes and simultaneously processing a sour field gas to produce gasoline which comprises the steps of:
   (a) passing said natural gas thru a first indirect heat exchange zone at a pressure in the range of 500–750 p.s.i.a. to cool same to a temperature below 0° F;
   (b) from the chilled gas separating a first condensate lean in nitrogen and rich in natural gasoline and a first uncondensed gas lean in natural gasoline and rich in nitrogen, methane, and ethane;
   (c) passing the uncondensed gas thru a second indirect heat exchange zone to further chill same;
   (d) expanding the chilled gas from step (c) to a pressure in the range of 200–400 p.s.i.a. to further chill same;
   (e) from the chilled gas of step (d), separating a second condensate consisting predominantly of methane and ethane and a second uncondensed gas consisting predominantly of nitrogen, methane, and ethane;
   (f) passing the second condensate and the second uncondensed gas from step (e) substantially at their existing pressures, separately and serially thru second and said first heat exchange zones, said condensate and said gas being the sole coolants in said second heat exchange zone;
   (g) expanding said first condensate to chill same and passing the resulting fluid thru said first heat exchange zone as coolant;
   (h) passing said sour field gas to a gasoline extraction plant to extract gasoline therefrom, said plant utilizing fuel for heating purposes;
   (i) passing the effluent second gas from step (f) to said plant and utilizing same as at least a part of said fuel, whereby some of said sour feed gas normally burned as fuel in said plant is released for other uses;
   (j) passing the effluent first condensate from step (g) to said plant to extract gasoline therefrom;
   (k) recovering the effluent second condensate from step (f) in gas form as an upgraded gas product meeting heating gas standards; and
   (l) recovering gasoline from said plant.

2. The method of claim 1 wherein the effluent gas from step (a) is chilled to a temperature in the range of −30 to −50° F., said gas in step (c) is further chilled to a temperature in the range of −140 to −180° F., and the expanded gas in step (d) is chilled to a temperature in the range of −160 to −200° F.

3. The method of claim 1 wherein the $N_2$ concentration in said natural gas is in the range of 18 to 31 mol percent, a substantial portion of the chilling in the first heat exchange zone of step (a) is effected by an extraneous refrigerant and the chilling in the second heat exchange zone of step (c) is effected solely by the second uncondensed gas and the second condensate of step (f).

References Cited by the Examiner

UNITED STATES PATENTS

| | | | |
|---|---|---|---|
| 1,020,102 | 3/1912 | Vonlinde | 62—23 |
| 1,773,012 | 8/1930 | Schuftan. | |
| 1,865,135 | 6/1932 | Pollitzer et al. | 62—23 X |
| 1,913,805 | 6/1933 | Hausen | 62—23 X |
| 2,209,534 | 7/1940 | Moore. | |
| 2,265,527 | 12/1941 | Hill | 62—23 |
| 2,495,549 | 1/1950 | Roberts. | |
| 2,557,171 | 6/1951 | Bodle et al. | 62—31 X |
| 2,582,148 | 1/1952 | Nelly | 62—23 X |
| 2,591,658 | 4/1952 | Haringhuizen | 62—23 |
| 2,823,523 | 2/1958 | Eakin | 62—40 X |
| 2,936,593 | 5/1960 | Grunberg. | |
| 2,940,271 | 6/1960 | Jackson | 62—23 X |
| 2,973,834 | 3/1961 | Cicalese | 62—23 |

NORMAN YUDKOFF, *Primary Examiner.*

ROBERT A. O'LEARY, *Examiner.*

UNITED STATES PATENT OFFICE
CERTIFICATE OF CORRECTION

Patent No. 3,224,211                          December 21, 1965

Joseph T. Karbosky

It is hereby certified that error appears in the above numbered patent requiring correction and that the said Letters Patent should read as corrected below.

Column 6, line 22, beginning with "2. The method" strike out all to and including "to -200° F." in line 27, same column 6; line 28, for "3." read -- 2. --; same column 6, line 34, after "step (f)." insert the following claim:

3. An apparatus comprising, in operable combination, first and second indirect heat exchangers, first and second separator vessels, a first conduit extending from a source of natural gas to be processed through said first exchanger to said first vessel, a second conduit extending from the normally vapor containing space of said first vessel through said second exchanger to said second vessel, third and fourth conduits extending respectively from the normally vapor and the normally liquid containing spaces of said second vessel sequentially through said second and said first exchangers, a fifth conduit extending from the normally liquid containing space of said first vessel through said first exchanger, first and second pressure reducing valves in, respectively, said fifth conduit intermediate said first vessel and said first exchanger and in said second conduit intermediate said second vessel and said second exchanger, a natural gas gasoline extraction plant having a heating means and an extraction means, said third conduit on the side of said first exchanger opposite said second exchanger communicating with said heating means, a sixth conduit leading from a second source of natural gas to be processed to said extraction means, said fifth conduit on the side of said first exchanger opposite said first vessel also communicating with said extraction means, a source of refrigerant and a sixth conduit extending from said source of refrigerant through said first exchanger and returning to said source of refrigerant, said first and second heat exchangers being the sole heat exchangers of said apparatus and said second, third, and fourth conduits being the sole heat exchange conduits in said second heat exchanger.

Signed and sealed this 24th day of January 1967.

(SEAL)
Attest:

ERNEST W. SWIDER                               EDWARD J. BRENNER
Attesting Officer                             Commissioner of Patents